Aug. 15, 1967 S. E. WHITING 3,336,561

ELECTRICAL CONNECTION MEANS

Filed Dec. 30, 1964 2 Sheets-Sheet 1

INVENTOR
STANLEY E. WHITING

BY Richard H. Smith
AGENT

ELECTRICAL CONNECTION MEANS

Filed Dec. 30, 1964

United States Patent Office 3,336,561

Patented Aug. 15, 1967

3,336,561

ELECTRICAL CONNECTION MEANS

Stanley E. Whiting, Rochester, Minn., assignor to International Business Machines Corporation, New York, N.Y., a corporation of New York Filed Dec. 30, 1964, Ser. No. 422,131
4 Claims. (Cl. 339—17)

The present invention relates to means for establishing electrical contact between two conductors and, more particularly, to means for establishing electrical contact between a wire lead and a conductive surface area on an insulative substrate, e.g., a printed circuit card such as a pluggable "paddlecard."

A well-known type of pluggable electrical connector is a planar, insulative substrate having plated conductive areas on its surface. Such a substrate is sometimes known as a "paddlecard." An edge portion of the card is adapted to plug into a well-known type of receptacle so that electrical contact is established between the receptacle contacts and the conductive surface areas on the card.

Heretofore, in employing such pluggable cards as plug terminals for wire leads, difficulty has been experienced in attaching the wire leads to the conductive surface areas on the card. Welding or soldering the ends of the wire leads directly to the conductive surface areas has been found to be unsatisfactory for at least two reasons. First, proper positioning of the wire ends on the correct conductive areas during the joining operation cannot be achieved without external fixtures which are expensive to provide and time-consuming to operate. Second, the joint produced has practically no mechanical strength of its own and additional strain relief means must be provided for each connection.

Another method that has been employed with but moderate success has been to place holes through the card near the areas where contact is to be established between the wire lead and the conductive portion of the card surface. The ends of the wire leads are inserted through the holes from the back side of the card and then bent over to make contact with the conductive surface. With the leads thus confined in holes, they are held in roughly the correct position for soldering.

Some of the difficulties experienced with this method have been that it is possible for the wire to twist in the hole before the soldering operation, thus pivoting the end of the lead off of the proper card contact spot. Further, it often happens that the ends of some of the wire leads are not fully bent over against the contact surface, causing an electrically poor and mechanically weak connection. Also, while this type of connection has more mechanical strength than the above first-mentioned type of connection, it is still necessary to employ external strain relief means.

It is therefore an object of the present invention to provide a paddlecard-wire lead connector which alleviates the problems heretofore experienced in the prior art.

Another object is to provide a connector for electrically joining a wire lead to a circuit card such as a paddlecard with a connection that has a high degree of mechanical strength in its own right.

A further object is to provide an electrical terminal connector that readily adapts to a welding operation.

Still another object is to provide inexpensive, easily assemblable, reliable connection means for electrically joining a wire lead to a circuit card such as a paddlecard.

In accordance with the present invention a pre-shaped connector is attached to the end of a wire lead. The connector cooperates with two holes in a paddlecard in such a manner that the connector is readily insertable through a first of the holes and is pivotable within said hole to a locking fit in the second hole. In the locked condition the connector is firmly held in position for subsequent electrical joining, through a process such as resistance welding, to the conductive surface of the card.

The locking engagement of the connector with the hole in the card relieves the contact junction between the connector and the card of practically all mechanical stress. For this reason, the usual external type of strain relief mechanism is not required.

The foregoing and other objects, features, and advantages of the invention will be apparent from the following more particular description of a preferred embodiment of the invention, as illustrated in the accompanying drawings.

Figure 7A:
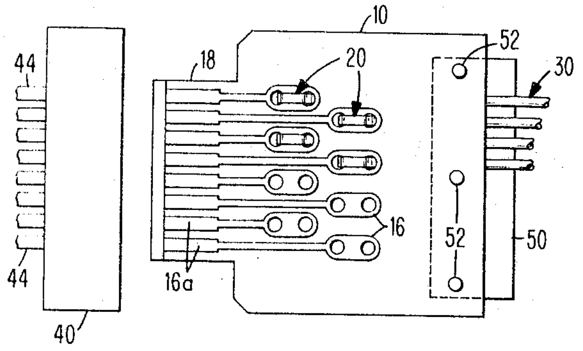

FIG. 7*a* is a plan view of a paddlecard including a plurality of electrical connections in accordance with the present invention. Also shown adjacent to the paddlecard is a conventional type of contact receptacle into which the paddlecard is adapted to be plugged.

Figure 7C:
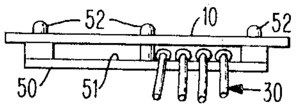
Figure 7B:
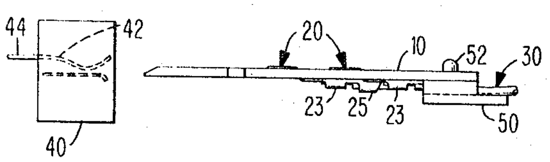

FIG. 7*b* is a side elevation of the paddlecard and plug receptacle of FIG. 7*a*.

FIG. 7*c* is an end elevation of the paddlecard of FIG. 7*a*.

FIGS. 8*a*, 8*b*, 8*c* and 8*d* are partially sectioned, side elevations of the electrical connector of the present invention and a portion of a paddlecard wherein four stages of the engagement process are depicted.

Figure 9:
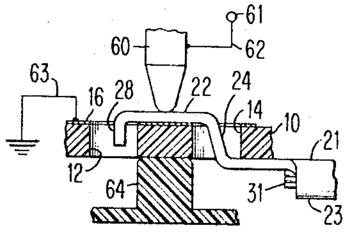

FIG. 9 is a schematic diagram illustrating one type of apparatus by which the connector of the invention may be welded to a conductive area on the paddlecard surface.

Referring to the drawings, a detailed description of a preferred embodiment of the connection means in accordance with the present invention will be given.

Figure 1:
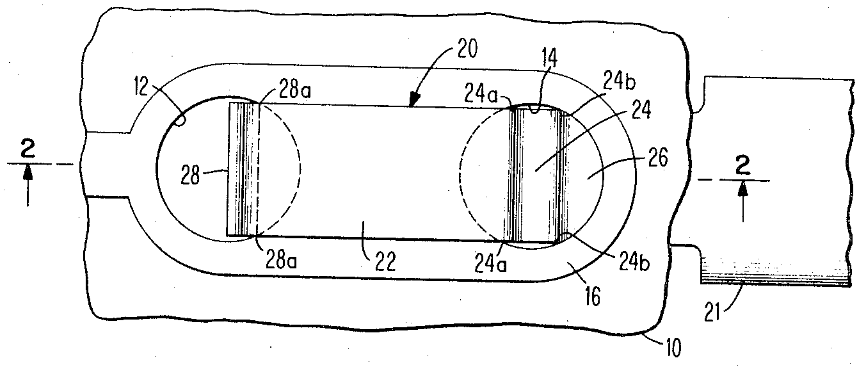
FIG. 1 is a plan view of an embodiment of the connector of the present invention shown in its locked position with a paddlecard.
Figure 2:
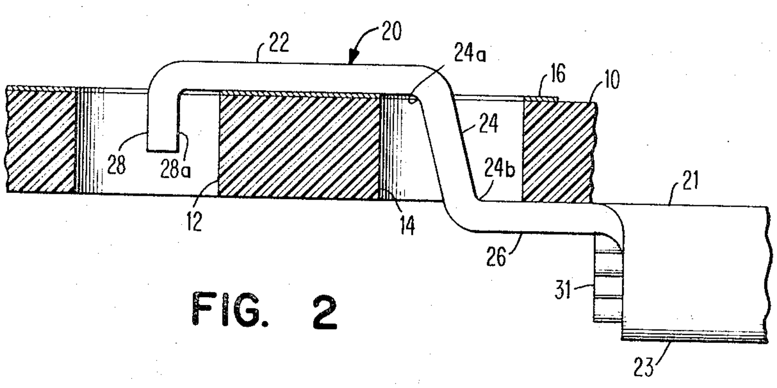
FIG. 2 is a partially sectioned view taken along the line 2—2 of FIG. 1.

As seen in FIGS. 1 and 2, the connection means of the invention comprises an insulative substrate 10, having on its surface a conductive area 16, and a hook-like connector element 20 connected to the substrate. The manner of fabricating the substrate, hereinafter referred to as a "paddlecard" or as simply a "card," is well known in the printed circuit art and therefore will not be discussed in detail herein.

Extending through the card and conductive surface portion thereof are a pair of through-holes 12 and 14 having axes substantially perpendicular to the plane of the card. As shown, the conductive surface portion 16 completely surrounds both holes 12 and 14 and covers the full surface area between them. The conductive area 16 may be placed into electrical contact with desired external circuits through insertion of the card 10 into a standard plug receptacle, as will be explained in detail subsequently. , The connector element 20 is engaged with the card through coaction with the holes 12 and 14, as shown. The connector element 20 comprises five integral segments: a ferrule 21, a stem 26, connecting offset 24, a parallel offset 22 and a right-angle tab 28. The connector is made, e.g., stamped, from a single piece of conductive material such as spring-temper Phosphor bronze having a thickness of from six to ten mils. Any other electrically conductive material may be used provided it has a relatively high tensile strength.

The ferrule 21 is in the shape of an inverted U and is adapted, as will subsequently be described, to be crimped onto a wire lead to secure the connector 20 thereto. Extending from the ferrule 21 are the stem 26, connecting offset 24, parallel offset 22 and right-angle tab 28, each of which is an integral section of a flat strip approximately 1/16 of an inch wide.

When the connector is in proper engagement with the card 10, the upper surface of stem 26 is in contact with the lower surface of the card and the lower surface of parallel offset 22 is in contact, or at least very close to, the conductive area 16. In any particular application of the subject connector, the length of the connecting offset 24 should be made an appropriate length to insure a close mating of these surfaces.

As can be seen from FIG. 1, the width of the strip which includes the tab 28, parallel offset 22 and connecting offset 24 is slightly less than the diameter of the holes 12 and 14. This permits quick and convenient engagement of the connector 20 with the card as will be subsequently described.

The connecting offset 24 lies substantially fully within the hole 14 and extends therethrough diagonally with respect to the axis of the hole. The exact extent of this incline is governed by the thickness of the card 10 and the exact width of the strip 20 in relation to the diameter of the hole 14. The purpose of so inclining the connecting offset 24 is to cause the corner edges **24*a* of the strip to bear against upper wall and edge portions of the hole 14 when the connector is engaged with the card. Similarly, the corner edges 24*b* of the strip bear against lower wall and edge portions of the hole 14. This causes the strip 20** to be tightly confined within the hole, affording strain relief by preventing forces exerted on the strip parallel to the plane of the card from causing relative movement between the connector and the card.

The right-angle tab 28 depending from parallel offset 22 extends in an interference fit into the hole 12, locking the connector 20 to the card. As can be seen from FIGS. 1 and 2, tab 28 enters the hole 12 offset from the center thereof, causing the inner edges **28*a* of the tab 28 to bind against the walls of the hole. It is desirable that the edges 28*a* actually dig into or frictionally engage the wall surfaces in order to produce the interference fit. This tightly locks the connector 20 into the position shown in FIGS. 1 and 2 and contributes further to the strain relieving characteristics of the connector, produced, as previously described, by the edges 24*a* and 24*b***.

Figure 3:
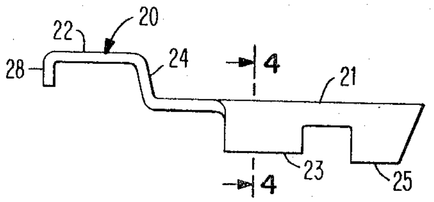
FIG. 3 is a side elevation of a connector element in accordance with the principles of the present invention.
Figure 4:
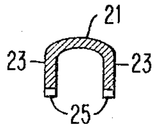
FIG. 4 is a sectional view taken along the line 4—4 of FIG. 3.
Figure 5:
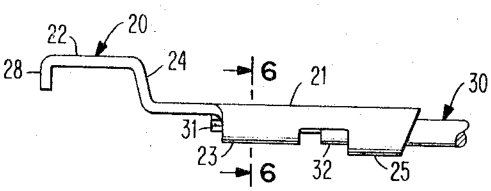
FIG. 5 is a side elevation of the connector element of the present invention shown crimped to the end of a wire lead.
Figure 6:
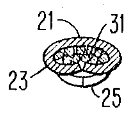
FIG. 6 is a sectional view taken along the line 6—6 of FIG. 5.

FIGS. 3 and 4 show the connector element by itself and illustrate the details of the ferrule 21. A pair of arms 23 are adapted to be crimped over, as clearly shown in FIGS. 5 and 6, to place the connector 20 in tight, electrical engagement with a stripped end portion 31 of a wire lead 30. A pair of arms 25 are adapted to be crimped over to engage the insulative sheath 32 of the wire lead 30 to provide a degree of strain relief for the electrical junction between the wire end 31 and the arms 23. The crimping operation may be performed in any of the many ways well known to the art. Preferably, an insulative sleeve should be placed over the ferrule after crimping so as to prevent short circuits from occurring between lead wires which may, in final card assemblies, be closely spaced.

Figure 8A:
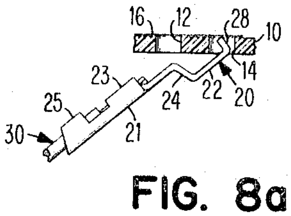
Figure 8B:
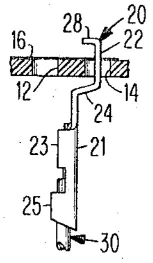
Figure 8C:
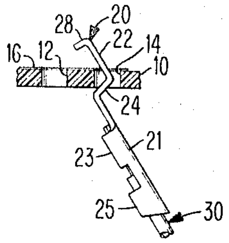
Figure 8D:
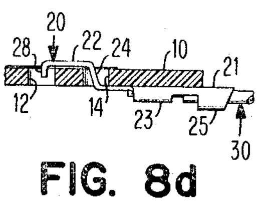

Referring now to FIGS. 8*a* through 8*d*, the manner in which the connector 20 may be placed into the previously described locking condition with the card 10 will be described. As shown in FIG. 8*a*, the connector assembly lies in the plane perpendicular to the surface of the card which contains the line joining the centers of the two through holes, and is inclined, either manually or with the aid of special assembly tools, at an acute angle with respect to the card and right-angle tab 28 is inserted into the hole 14. By pivoting the connector assembly counterclockwise to a vertical position, FIG. 8*b*, the right-angle tab 28 and parallel offset 22 are moved through the hole. Continued pivoting of the connector, FIG. 8*c*, causes the parallel offset to clear the hole and places the connecting offset 24 angularly into the hole. Finally, FIG. 8*d*, the ferrule 21 is brought upwards against the lower surface of the card and the right-angle tab 28 is pressed into locking engagement, as previously described, with the walls of hole 12.

When thus assembled, the connector 20 tightly grips the card 10, alleviating practically all danger of the connector coming loose from the card during the succeeding assembly steps preceding the final welding or soldering operation which places the connector 20 into permanent electrical engagement with the surface 16. Thus, a plurality of connectors 20 may be assembled to the card 10, and then gang welded in one operation to place each of the connectors 20 into permanent electrical engagement with the surface 16.

FIG. 9 schematically depicts a resistance or "spot" welding setup suitable for joining the connector element 20 and conductive surface 16. A pedestal 64 provides a support for a connector-card assembly to be welded. A conductive probe 60 is connected to a source of voltage via a terminal 61 and lead 62. The probe is adapted to have a downward pressure applied to it by apparatus not shown. A closed electric circuit is provided through the junction to be welded by means of a grounded lead 63, clamped to the conductive surface 16. A fused, low-impedance electrical junction is created in accordance with conventional resistance welding technique between the surface 16 and the parallel offset 22 when mechanical pressure and electric current are simultaneously supplied to the junction by means of the probe 60.

Referring now to FIGS. 7*a*, 7*b* and 7*c* there will be given a description of a complete plug assembly in accordance with the invention. As shown in the plane view of FIG. 7*a*, the card 10 has, extending from one of its sides, a projecting portion 18, hence the term "paddlecard." On the projection 18 are a plurality of conductive land areas **16*a*, each of which is connected via a thin conductive strip to one of the conductive areas 16. A conventional type card receptacle 40 is shown in position to receive the projection 18. Within the receptacle 40** are a plurality (FIG. 7*b*) of spring contact members 42, each adapted to establish electrical contact with one of the lands **16*a*. A plurality of pins 44 provide connection of the individual contacts 42 with desired external circuitry (not shown). Four lead wires 30 are shown connected by means of four connecting elements 20** to the upper four contact positions on the paddlecard.

Also shown in FIGS. 7*a*, 7*b* and 7*c* is a retaining bracket 50 mounted on the card 10 by means of three press-fit lugs 52. The bracket 50 is preferably molded in one piece from an insulative material. As shown in FIG. 7*c* the bracket provides a slot 51 for loosely confining the leads 30. This maintains the lead wires in an orderly grouping and protects the connector elements 20 from fatigue breakage, twisting, bending, etc., due to unusual tugging and jerking forces applied to the leads. It is particularly important that the lead wires be restrained from substantial movement in a downward direction, as seen in FIG. 7*b*, since such movement, without the restraining influence of bracket 50, could dislodge the tab 28 from the hole 12 and/or cause bending of the connector element 20 at the point where the stem 26 and connecting offset 24 meet (see FIG. 2). It is to be appreciated that no external retaining or strain relieving means is necessary to guard against the effect of forces parallel to the plane of the card 10 tending to pull the lead wires 30 away from the card. The reason for this is the unique strain relieving coaction, previously described in detail, between the connector 20 and the card 10. The bracket 50 acts more as a retainer than as a strain relief, as is apparent by the loose manner in which it coacts with the leads 30.

In summary, it may be seen that the invention provides an inexpensive, easily assemblable, and reliable connection means for electrically joining lead wires to printed circuit cards, particularly pluggable "paddlecards." A minimum amount of assembly equipment and effort is required to insert the connecting elements 20 into engagement with the card 10. Nothing further is required to hold them in proper position for a subsequent permanent joining operation. Also, the relative thinness and wide contact area of the parallel offset 22 render the connection means of the invention easily weldable to the conductive surface areas with which they must be electrically joined.

While the invention has been particularly shown and described with reference to a preferred embodiment thereof, it will be understood by those skilled in the art that various changes in form and details may be made therein without departing from the spirit and scope of the invention.

What is claimed is:

1. A terminal connector adapted to contact a conductive surface between two holes in a substrate, said connector comprising:
  - a strip of conductive material insertable through a first of said holes, said strip including a stem portion and a parallel offset portion substantially parallel thereto, said latter portion being adapted to contact said conductive surface;
  - a right-angle tab at the end of said parallel offset portion adapted to hook in and frictionally engage the second of said holes; and
  - a connecting offset joining said stem and parallel offset portions of said strip, said connecting offset extending through said first hole and frictionally engaging the wall thereof when said tab is hooked in said second hole and said parallel offset portion is in contact with said conductive surface.

2. A terminal connector adapted to contact a conductive surface between two holes in a substrate, said connector comprising:
  - a strip of conductive material insertable through a first of said holes, said strip including a stem portion and a parallel offset portion substantially parallel thereto, said latter portion being adapted to contact said conductive surface;
  - a right-angle tab at the end of said parallel offset portion adapted to hook in the second of said holes, the width of said tab being such that the edges of said tab frictionally engage the walls of said second hole; and
  - a connecting offset joining said stem and parallel offset portions of said strip, said connecting offset extending diagonally through said first hole when said tab is hooked in said second hole and said parallel offset portion is in contact with said conductive surface, said connecting offset being oriented so as to engage upper and lower portions of opposed sides of the walls of said first hole.

3. The method of connecting a conductive surface between two through holes in a printed circuit card and a strip of conductive material; said strip having a stem portion, a parallel offset portion substantially parallel to said stem portion, a right angle tab at the end of said parallel offset portion, and a connecting offset portion joining said stem and parallel offset portions; comprising the steps of:
  - placing said strip to the side of said card opposite said conductive surface, said strip being in the plane perpendicular to said card which contains the line joining the centers of the two through holes, with said right angle tab contiguous the first through hole and extending toward the second through hole, and said strip forming an acute angle with said line joining the centers of the two through holes;
  - inserting said right angle tab into said first through hole;
  - pivoting said strip to position said right angle tab above the conductive surface and extending toward the second through hole;
  - pivoting said strip and simultaneously forcing
    - said right angle tab to frictionally engage the edge and wall portions of the second through hole,
    - said connecting offset portion to frictionally engage the upper and lower wall and edge portions of said first through hole, and
    - said parallel offset portion to contact said conductive surface between the two through holes;
  - and welding said parallel offset portion to said conductive surface.

4. The method of connecting a plurality of conductive strips to a printed circuit card; said card having a plurality of pairs of through holes with a conductive surface between each such pair of through holes; each of said strips having a stem portion, a parallel offset portion substantially parallel to said stem portion, a right angle tab at the end of said parallel offset portion, and a connecting offset portion joining said stem and parallel offset portions; comprising the steps of:
  - attaching each strip to the printed circuit card at its corresponding pair of through holes with the parallel offset portion in contact with the conductive surface between said pair of through holes, by:
    - placing each strip to the side of the card opposite said conductive surface, said strip being in the plane perpendicular to said card which contains the line joining the centers of the pair of through holes to which said strip is to be attached, with said right angle tab contiguous to the first of said pair of through holes and extending toward the second of said pair of through holes, and said strip forming an acute angle with said line joining the center of said pair of through holes;
    - inserting each said right angle tab into the first of said pair of through holes;
    - pivoting each said strip to position said right angle tab above the conductive surface and extending toward the second of said pair of through holes;
    - pivoting each said strip and simultaneously forcing
      - said right angle tab to frictionally engage the edge and wall portions of the second of said pair of through holes,
      - said connecting offset portion to frictionally engage the upper and lower wall and edge portions of the first of said pair of through holes, and
      - said parallel offset portion to contact said conductive surface between said pair of through holes;
  - and welding the parallel offset portion of each of the plurality of said strips to their corresponding conductive surfaces between the plurality of pairs of through holes in the printed circuit card.

(References on following page)

References Cited

UNITED STATES PATENTS

| | | | |
|---|---|---|---|
| 2,306,389 | 12/1942 | Jorgensen | 339—221 X |
| 2,497,484 | 2/1950 | Wood | 339—221 |
| 2,499,296 | 2/1950 | Buchanan | 339—258 |
| 2,858,515 | 10/1958 | Thunander et al. | 339—17 |
| 2,932,810 | 4/1960 | Novak | 339—17 |
| 3,056,939 | 10/1962 | Rayburn | 339—17 |
| 3,069,599 | 12/1962 | Schon | 339—17 X |
| 3,103,399 | 9/1963 | Martin | 339—17 |
| 3,155,767 | 11/1964 | Schellack | 339—17 X |
| 3,202,755 | 8/1965 | Oswald | 339—17 X |
| 3,202,954 | 8/1965 | Kinkaid | 339—47 |
| 3,202,955 | 8/1965 | McKee | 339—59 |

FOREIGN PATENTS

| | | |
|---|---|---|
| 913,092 | 12/1962 | Great Britain. |

MARVIN A. CHAMPION, *Primary Examiner.*

ALFRED S. TRASK, PATRICK A. CLIFFORD, *Examiners.*